(12) United States Patent
Yang et al.

(10) Patent No.: US 10,942,306 B2
(45) Date of Patent: Mar. 9, 2021

(54) SUPERIMPOSED DIFFRACTION GRATINGS FOR EYEPIECES

(71) Applicant: Magic Leap, Inc., Plantation, FL (US)

(72) Inventors: Shuqiang Yang, Austin, TX (US); Vikramjit Singh, Pflugerville, TX (US); Kang Luo, Austin, TX (US); Nai-Wen Pi, Plano, TX (US); Frank Y. Xu, Jr., Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/685,505

(22) Filed: Nov. 15, 2019

(65) Prior Publication Data

US 2020/0158942 A1 May 21, 2020

Related U.S. Application Data

(60) Provisional application No. 62/768,672, filed on Nov. 16, 2018.

(51) Int. Cl.
*G02B 6/00* (2006.01)
*F21V 8/00* (2006.01)
*G02B 25/00* (2006.01)
*G02B 27/00* (2006.01)

(52) U.S. Cl.
CPC ......... *G02B 6/0036* (2013.01); *G02B 6/0065* (2013.01); *G02B 25/001* (2013.01); *G02B 27/0081* (2013.01)

(58) Field of Classification Search
CPC .... G02B 6/0036; G02B 6/0065; G02B 6/001; G02B 6/0081
USPC .......................................................... 385/37
See application file for complete search history.

(56) References Cited

U.S. PATENT DOCUMENTS

2018/0052276 A1* 2/2018 Klienman ............ G02B 6/0023
2018/0059297 A1 3/2018 Peroz et al.

FOREIGN PATENT DOCUMENTS

WO WO 2015/079051 6/2015

OTHER PUBLICATIONS

PCT International Search Report and Written Opinion in International Application No. PCT/US2019/061860, dated Feb. 7, 2020, 8 pages.

* cited by examiner

*Primary Examiner* — Jerry M Blevins
(74) *Attorney, Agent, or Firm* — Fish & Richardson P.C.

(57) ABSTRACT

Embodiments of the present disclosure are directed to techniques for manufacturing an eyepiece (or eyepiece layer) by applying multiple, different diffraction gratings to a single side of an eyepiece substrate instead of applying different gratings to different sides (e.g., opposite surfaces) of the substrate. Embodiments are also directed to the eyepiece (or eyepiece layer) that is arranged to have multiple, different diffraction gratings on a single side of the eyepiece substrate. In some embodiments, two or more grating patterns are superimposed to create a combination pattern in a template (e.g., a master), which is then used to apply the combination pattern to a single side of the eyepiece substrate. In some embodiments, multiple layers of patterned material (e.g., with differing refraction indices) are applied to a single side of the substrate. In some examples, the combined grating patterns are orthogonal pupil expander and exit pupil expander grating patterns.

19 Claims, 10 Drawing Sheets

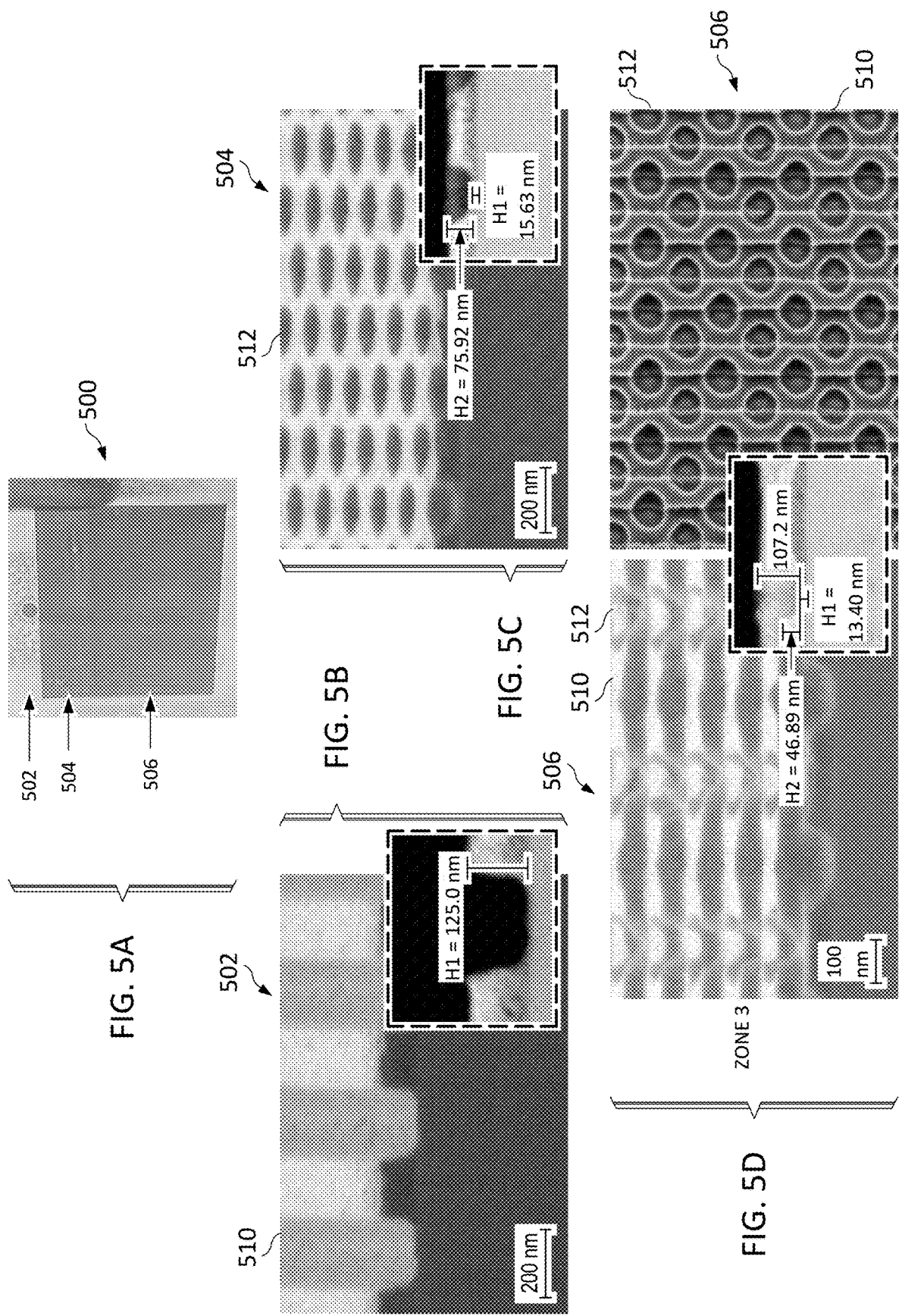

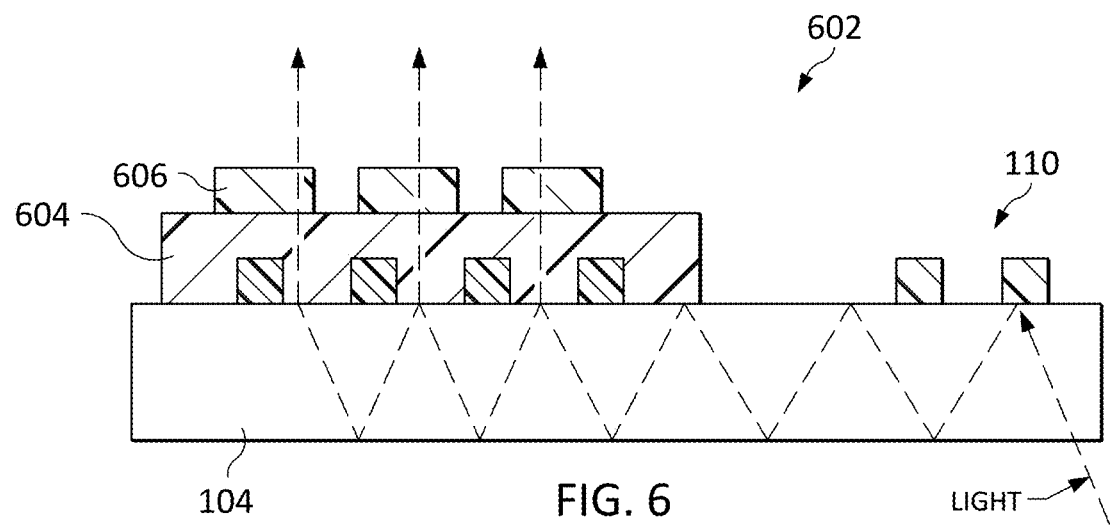

tion and Si; the method further including employing the template to apply the combined pattern to one side of the waveguide, such that the combined pattern on the waveguide exhibits both OPE and EPE diffraction properties; and/or employing the template further includes contacting the template with a polymerizable material arranged on the one side of a substrate of the waveguide, solidifying the polymerizable material to form, on the one side of the substrate, the combined pattern based on the template, and separating the template from the substrate. The refractive index of the OPE grating may exceed the refractive index of the EPE grating. The refractive index of the substrate may exceed the refractive index of the OPE grating and the refractive index of the EPE grating. A difference between the refractive index of the OPE grating and the refractive index of the EPE grating may be at least 0.2. The OPE grating, the EPE grating, or both may include a line grating, pillars or holes, or both.

SUPERIMPOSED DIFFRACTION GRATINGS FOR EYEPIECES

CROSS-REFERENCE TO RELATED APPLICATION

This application claims the benefit of U.S. Provisional Patent Application No. 62/768,672 entitled "SUPERIMPOSED DIFFRACTION GRATINGS FOR EYEPIECES" and filed on Nov. 16, 2018, which is incorporated by reference herein in its entirety.

BACKGROUND

In optical devices, light can be directed and/or manipulated to achieve a desired effect. For example, in an optical device such as an eyepiece used in a virtual reality or augmented reality interface, visible light can be directed and/or manipulated to provide image data that is perceived by a user. Some optical devices have a design that is necessarily complex to achieve a desired effect, and the manufacturing process for such devices may therefore require exacting standards. Accordingly, the manufacture of the devices can be expensive, time consuming, and/or vulnerable to the introduction of defects. As such, device manufacturers seek techniques to simplify the manufacturing process where possible.

SUMMARY

Embodiments of the present disclosure are generally directed to techniques for simplifying complex optical devices (also described as eyepieces) by applying multiple, different diffraction gratings to a single side of an eyepiece substrate instead of applying different gratings to different sides (e.g., opposite surfaces) of the substrate. More specifically, embodiments are directed to creating a template (also described as a master) by superimposing at least two different patterns to provide a combination pattern in the template, and using the template to imprint the combination pattern onto the substrate of the eyepiece to achieve the desired optical properties of the eyepiece. Embodiments are also directed to applying multiple layers of patterned material (e.g., with differing refraction indices) to a single side of the substrate to achieve the desired optical properties.

In general, innovative aspects of the subject matter described in this specification can be included in one or more embodiments of a method for providing a template that is usable for applying a grating pattern to a waveguide, the method including: forming a first pattern in a first side of a template substrate; and forming a second pattern in the first side of the template substrate to form the template, the second pattern being superimposed onto the first pattern in the template substrate to form the template that includes, on one side of the template, a combined pattern that is a combination of the first pattern and the second pattern, wherein the first pattern corresponds to one of an orthogonal pupil expander (OPE) grating or an exit pupil expander (EPE) grating, and wherein the second pattern corresponds to a different one of the OPE grating or the EPE grating.

One or more embodiments can optionally include one or more of the following features: forming the first pattern in the first side of the template substrate includes etching the first pattern; forming the second pattern in the first side of the template substrate includes using lithography to imprint the second pattern; forming the second pattern in the first side of the template substrate includes transferring the second pattern from resist into the template substrate using dry etching; the template substrate is composed at least partly of one or more of $SiO_2$ Innovative aspects of the subject matter described in this specification can also be included in one or more embodiments of a waveguide structure that includes a substrate and a combined pattern applied to one side of the substrate, wherein the combined pattern is a superposition of an orthogonal pupil expander (OPE) diffraction grating pattern and an exit pupil expander (EPE) diffraction grating pattern, such that the combined pattern on the waveguide structure exhibits both OPE and EPE diffraction properties.

One or more embodiments can optionally include one or more of the following features: the waveguide structure further includes an in-coupling grating (ICG) pattern; and/or the substrate is glass. The refractive index of the OPE diffraction grating pattern may exceed the refractive index of the EPE diffraction grating pattern. The refractive index of the substrate may exceed the refractive index of the OPE diffraction grating pattern and the refractive index of the EPE diffraction grating pattern. A difference between the refractive index of the OPE diffraction grating pattern and the refractive index of the EPE diffraction grating pattern may be at least 0.2. The OPE diffraction grating pattern, the EPE diffraction grating pattern, or both may include a line grating, pillars or holes, or both.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF DRAWINGS

FIGS. 5A-5D show images of combination pattern imprinted onto an eyepiece, according to embodiments of the present disclosure.

FIG. 6 depicts a schematic of an example eyepiece, according to embodiments of the present disclosure.

DETAILED DESCRIPTION

Figure 1:
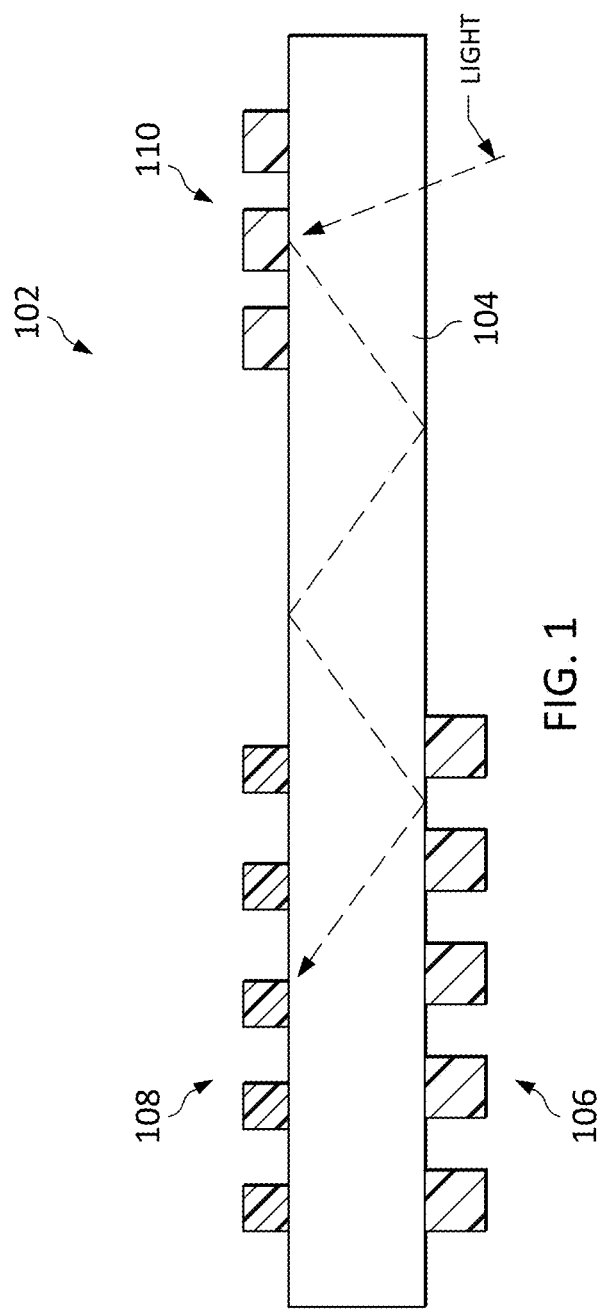
FIG. 1 depicts a schematic of an example eyepiece of a previously available configuration.

Embodiments of the present disclosure are directed to techniques for manufacturing an eyepiece (or a layer of an eyepiece) by applying multiple, different diffraction gratings to a single side of an eyepiece substrate instead of applying different gratings to different sides (e.g., opposite surfaces) of the substrate. Embodiments are also directed to the eyepiece (or eyepiece layer) that is arranged to have multiple, different diffraction gratings on a single side of the eyepiece substrate.

In some embodiments, two or more grating patterns are superimposed to create a combination pattern in a template (e.g., a master), which is then used to apply the combination pattern to a single side of the eyepiece substrate. In some embodiments, multiple layers of patterned material (e.g., with differing refraction indices) are applied to a single side of the substrate. For example, an eyepiece utilizing a high index glass diffraction grating waveguide is formed as a composite structure of (e.g., silicone-acrylate) adhesive, inorganic anti-reflective coating, high-index glass substrate, and patterned polymer gratings.

Embodiments provide a diffraction grating based waveguide display that can be used for a near-eye display, such as in a virtual reality or augmented reality apparatus. Some embodiments employ a 3D pattern overlaid architecture in the final waveguide architecture or use it to etch a modified 3D pattern into templates, which can then be used to imprint nano-structures on transparent substrates to make near-eye display eyepiece. The 3D overlaid pattern in the imprinted device and/or template combine multiple, different diffraction gratings into one 3D pattern. Accordingly, embodiments enable the avoidance of multi-imprints (e.g., a double-sided imprint as described below) and instead provide for a single imprint with similar planform area.

Traditionally, an eyepiece can include various eyepiece grating regions with different refraction gratings to achieve various optical effects. Such regions can include an orthogonal pupil expander (OPE) region, an exit pupil expander (EPE) region, and an in-coupling grating (ICG) region. When the eyepiece is included as a component of a virtual reality headset, augmented reality headset, or other suitable apparatus, a projector of the apparatus may project image light onto the ICG region of an eyepiece layer. The ICG region can couple the image light from the projector into a planar waveguide that propagates the light in a direction toward the OPE region. The waveguide may propagate the image light in the horizontal direction through internal reflection. The OPE region can include a diffractive grating that multiplies and redirects a portion of the image light toward the EPE region. For example, the OPE region may multiply the light in an orthogonal direction within the waveguide and direct the multiplied light to various portions of the EPE region. The EPE region can include a (e.g., different) diffractive grating that out-couples and directs at least a portion of the light, in a direction outward from the plane of the eyepiece layer, and/or toward the human viewer's eye. For example, the EPE grating can direct light at an angle that is substantially perpendicular to the plane of the eyepiece layer, and/or at some other angle such as a 45 degree angle relative to the plane of the eyepiece layer depending on specific design characteristics of the grating dimensions. In this fashion, an image projected by the projector may be received and viewed by the viewer's eye.

For mixed reality (e.g., augmented or virtual reality) diffraction grating waveguide displays, EPE and OPE regions have been traditionally used to display an image with an expanded pupil area. In some previously available solutions, OPE and EPE regions were arranged in different portions of the eyepiece. Later, to reduce form factor area, EPE and OPE regions were imprinted on the opposite sides of the transparent substrate. An example of such double-side imprinting is shown in FIG. 1. FIG. 1 shows an example of double-side imprinting of an eyepiece 102. In eyepiece 102, the EPE region 106 and the OPE region 108 are arranged on opposite sides of the substrate 104, in an area of the eyepiece 102 that, for example, may be separate from the ICG region 110.

This double-side imprinting typically requires strict angle alignment between the two sides, and also typically requires both sides of the substrate to be clean. Such constraints can make the double-side imprinting process more complicated, e.g., by reducing speed and throughput of the manufacturing, increasing cost, and providing an increased likelihood of the introduction of manufacturing flaws. Moreover, the double-sided imprinting prevents the use of an anti-reflective coating or other application on both sides of the substrate, where the use of such an application may otherwise provide advantages.

Figure 2:
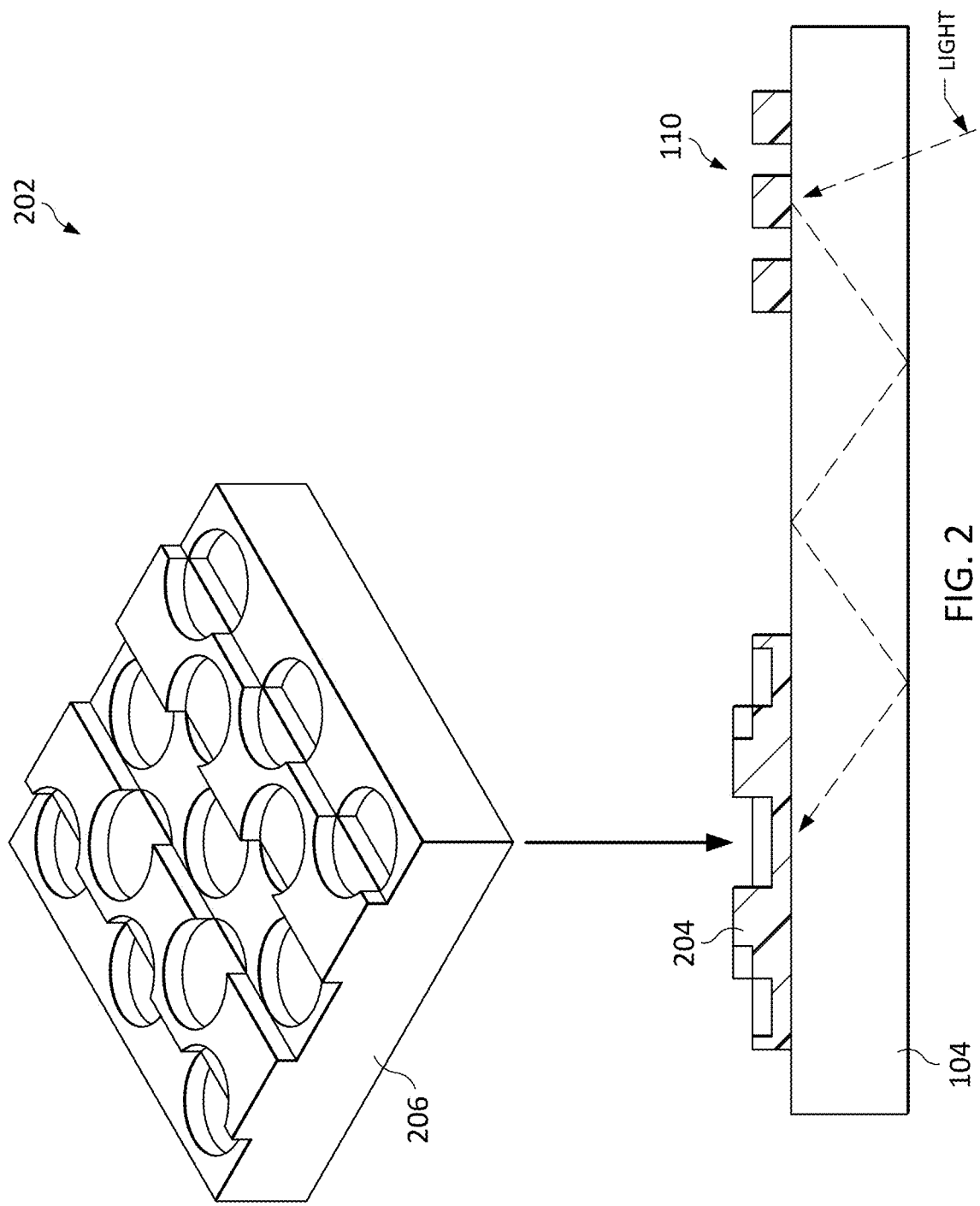
FIG. 2 depicts a schematic of an example eyepiece, according to embodiments of the present disclosure.

FIG. 2 depicts a schematic of an example eyepiece 202, according to embodiments of the present disclosure. In this example, the OPE and EPE regions are combined into a combination grating 204 that is imprinted onto one side of the substrate 104. For example, a template 206 (e.g., a master) can be created to includes a superposition of (e.g., inverse or non-inverse versions of) the OPE and EPE gratings, and the template can be used to imprint the combination grating 204 as a 3D structure onto a single side of the eyepiece 202.

Figure 3:
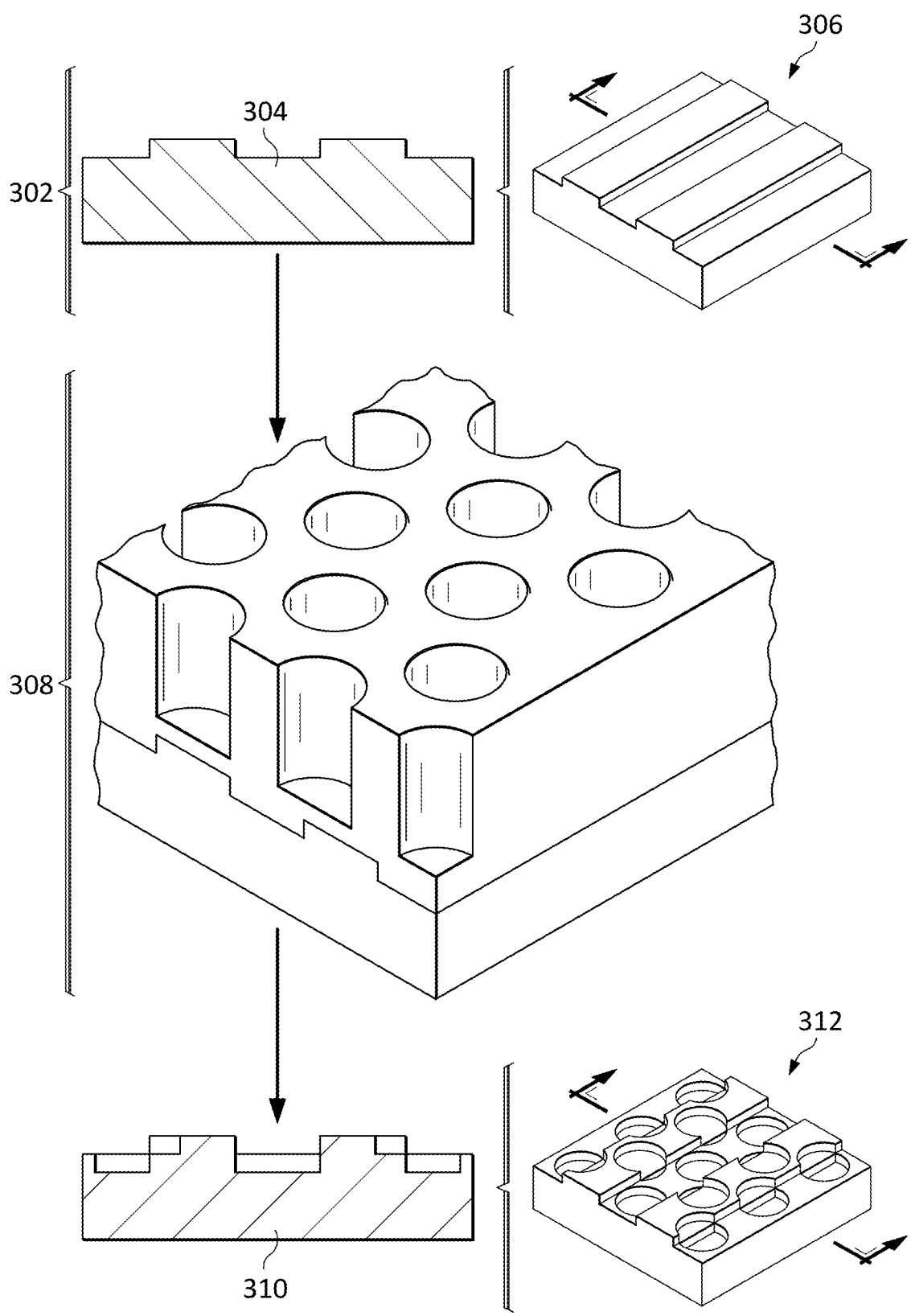
FIG. 3 depicts an example process for creating a template to apply a combination grating pattern to an eyepiece, according to embodiments of the present disclosure.

FIG. 3 depicts an example process for creating the template 206, which can be employed to imprint the combination OPE and EPE pattern 204 onto any suitable number of eyepieces. In this example, a 3D template is fabricated using a double etch method.

During a first phase 302, the first (e.g., OPE) pattern is etched on the template, to generate a partially etched template 304, which is also shown in perspective view 306. The template substrate can be any suitable material, such as $SiO_2$, Si, and so forth. This example shows the first grating pattern as a circle hole 2D grating, but other shapes or patterns can also be used such as a square pattern, pillar tone, and so forth. The grating array is shown as square, can also be some other array such as a diamond array.

During a second phase 308, the second (e.g., EPE) pattern is imprinted or otherwise formed on top of the template 304 to generate the template 310, which is also shown in perspective view 312. The second pattern can be a one- or two-dimensional pattern and can include line gratings, pillars, holes, or any known diffraction pattern designed to modify an angle of propagation of light such that it exits the waveguide. The imprinting of the second pattern can be through lithography, such as any suitable technique for imprint lithography, photo-lithography, e-beam lithography, and so forth. This phase can apply patterned resist for the second pattern on top of the etched first pattern. In some examples, the second pattern is transferred from resist into substrate using dry etch, and/or the resist is striped after the dry etching, to combine the two patterns into one 3D pattern. In some examples, the OPE pattern is applied first (e.g., in the first phase), and the EPE pattern is applied on top (e.g., in the second phase). Alternatively, the EPE pattern can be applied first, followed by the OPE pattern. In either example, the completed 3D template can be used to apply the combination pattern to the eyepiece which has both the OPE and EPE diffraction properties.

Figure 4A:
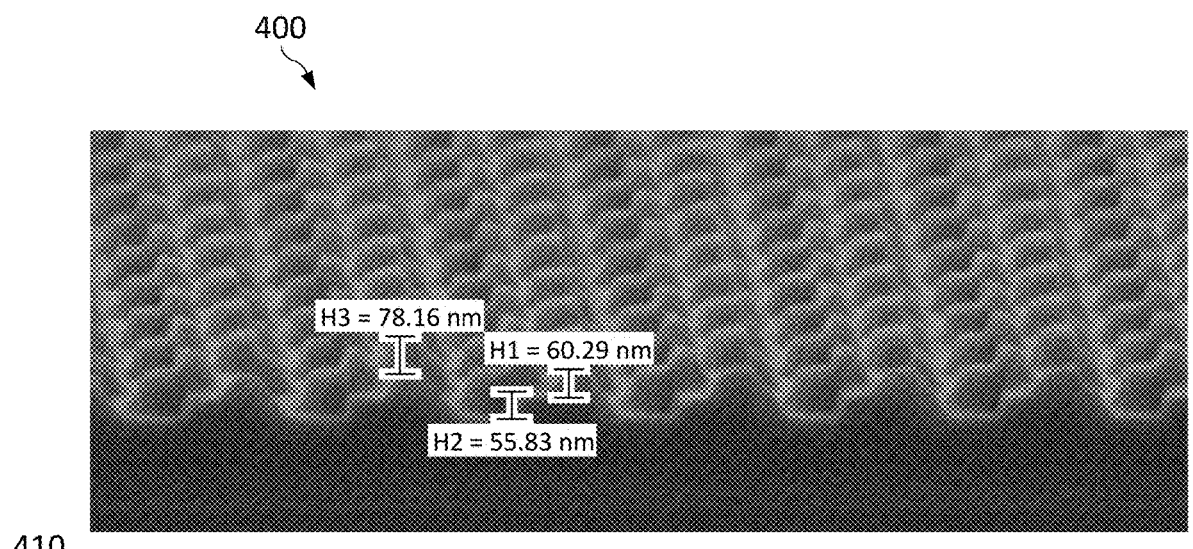
FIGS. 4A and 4B show images of a template created according to embodiments of the present disclosure.
Figure 4B:
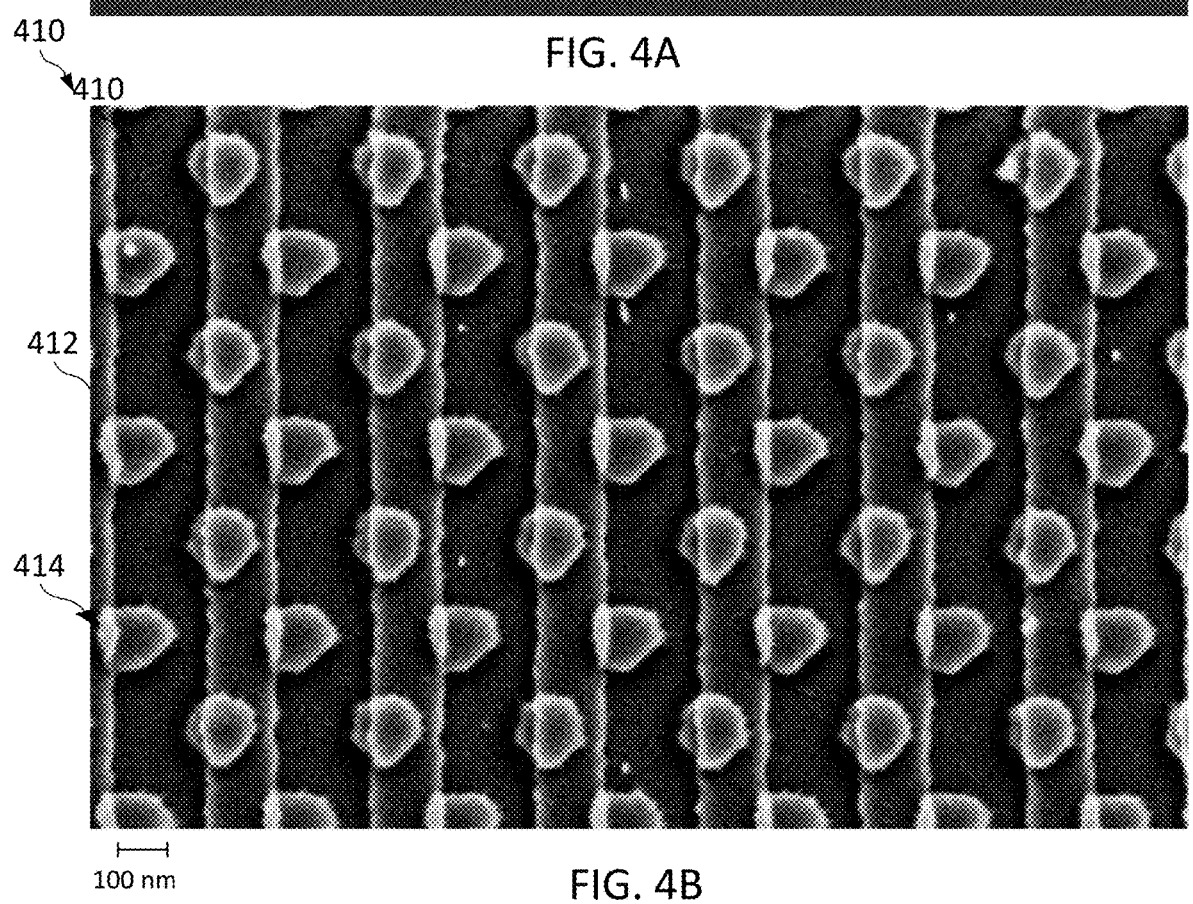

FIG. 4A is a perspective cross-sectional view of template 400 created according to embodiments of the present disclosure. FIG. 4B is a top view of template 410, which includes line grating 412 and holes 414.

FIG. 5A is an image of the combination pattern imprinted onto an eyepiece, according to embodiments of the present disclosure. As shown, a single waveguide 500 can include multiple regions or zones having different grating structures. For example, a first zone 502 can include incoupling gratings (ICGs), such as line gratings, configured to receive input light from a projector and alter the propagation angles such that the light can move through the waveguide by total internal reflection toward a second zone. The second zone 504 can include different grating structures than the first zone 502. As shown, the second zone 504 can include at least one of an OPE or an EPE structure. FIG. 5B shows line gratings 510 in first zone 502. FIG. 5C shows second zone 504 with a 2D grating having pillars or holes 512, to divide and redirect at least a portion of the light to spread and multiply the image light within the plane of the waveguide and toward a third zone 506. The third zone 506 can include a combined OPE/EPE grating structure as described herein with respect to FIG. 3, for example. FIG. 5D shows line grating 520 and holes 512 in third zone 506. One of skill in the art will appreciate that other configurations are possible, the configurations having more or fewer zones of different diffraction grating structures. For example a waveguide can have a zone with ICG grating structures directing light directly to a zone having a combined single-sided OPE/EPE grating structure, such as a single-sided 3D grating structure. Each zone can have grating structures formed on top of or within the waveguide material.

The examples of FIGS. 4 and 5 show an opposite pattern tone. The imprint lithography process can involve a single tone reversal in which the template and final imprint on the substrate are of opposite tones. Alternatively, the imprint lithography process can involve a two tone reversal in which an intermediate template is made from the opposite tone of the template and the template's tone is transferred as is to the final substrate (e.g., with the opposite tone of the intermediate template). The intermediate template can be an imprint lithography based template of rigid or flexible substrate that is made using additional processing steps such as CVD, PVD, and/or plasma based processes.

The combination pattern that is a superposition of the OPE and EPE patterns can be described as a first architecture for the eyepiece gratings. Embodiments also support a second architecture of combining the OPE and EPE patterns on the same side of a (e.g., high refractive index) substrate. This second architecture can include a relief layer structure EPE patterned over OPE both using a different index material. The first pattern can either be etched into the substrate surface or coating over a surface to form a first set of relief structures. The second set of relief structures can be patterned over the first set, with a different index material, thus arranging the first relief layer under the second set of relief structures.

FIG. 6 shows an example eyepiece 602 arranged per one example of this second architecture. As shown in this example, the first pattern 604 (e.g., OPE) is applied to one side of the substrate 104, and the second pattern 606 (e.g., EPE) is applied on top of the first pattern 604. The light coming to the first OPE layer through internal reflection is coupled out toward the EPE structure sitting over the OPE layer. The OPE layer also sends a portion of that light orthogonally towards other areas of the OPE which then further couple light out through the EPE thus spreading the light as intended by the OPE structure.

In examples of the second architecture, the OPE and EPE relief structures can be packed vertically and very close on one side of the substrate. This, in such embodiments, instead of arranging OPE and EPE patterns on opposite surfaces of a flat thick (e.g., 300 µm) substrate as in previously available solutions, the OPE and EPE patterns can instead be separated by a distance of several hundred nanometers.

Both architectures enable OPE and EPE functionality to be combined either with material of one index or varying the index of the two layers sandwiched together. This enables imprinting both structures on one side, making manufacture simpler, faster, and higher quality, while still retaining the benefits of a wide field of view provided by the previously available overlap design. By applying the patterns on one side, both architectures leave the oppose side available for some other type of treatment, such as the application of an anti-reflective coating, the application of a laminate or epoxy to affix cover glass to the opposite side, and so forth. For both architectures, the application of patterns to one side can provide greater efficiency, lower cost, and/or fewer defects during manufacture. For example, application on one side may remove the need to flip the substrate during manufacture to apply a grating to the opposite side, as in previously available techniques. Application to one side also can reduce or eliminate problems with misalignment of the OPE and EPE layers. In the first architecture, the alignment can be imposed during the creation of the template, and alignment may be more reliable given the application of the two gratings to the same side of the template to create the combination pattern. In the second architecture, applying multiple layers on one side makes it easier to ensure more accurate alignment of the OPE and EPE layers because there is not a step of flipping the substrate between the application of the OPE and EPE gratings, as in previously available techniques.

In various embodiments for the second architecture, the OPE structure (grating) may be situated substantially between the EPE structure and the substrate. The OPE structure may be made of a material that has a different refractive index from the material that is used for the EPE structure. In one example, the OPE structure may have a refractive index of 1.65, and the EPE structure may have a refractive index of 1.52, with the substrate having a refractive index of 1.8. In some embodiments, the range of refractive indices of the employed materials for each layer may vary from 1.3 to 3.0, and embodiments may employ materials in which a difference between the refractive indices of the two layers (OPE and EPE) is at least 0.2. For example, the difference may be 0.25. The materials used may be adjusted to achieve a difference in refractive index that provides a desired brightness, contrast, and/or other properties of the image.

FIGS. 7-10 depict example processes for applying multiple layers of patterns to one side of a substrate, according to embodiments of the present disclosure.

Figure 7:
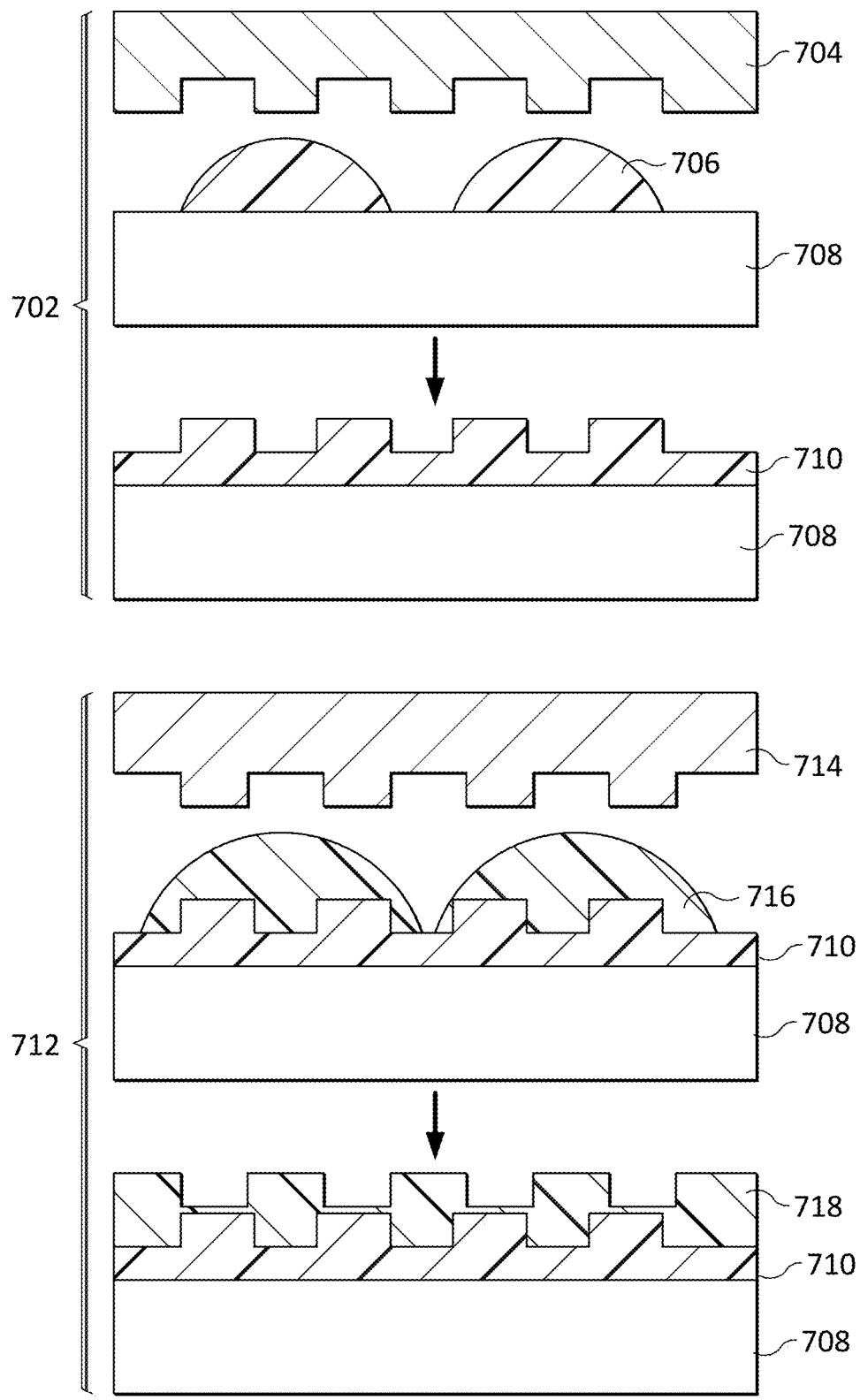
FIGS. 7-10 depict example processes for applying multiple layers of patterns, according to embodiments of the present disclosure.

As shown in the example of FIG. 7, during a first phase 702 a substance 706 with a first refractive index (e.g., 1.65) is applied to one side of the substrate 708, and a first template 704 is used to mold the substance 706 into the pattern 710 for the OPE layer. During a second phase 712, a substance 716 with a second, lower refractive index (e.g., 1.52) is applied on top of the OPE pattern 710, and a second template 714 is used to mold the substance 716 into the pattern 718 for the EPE layer. First and second substances 706 and 716 can be cured to form first and second patterns 710 and 718, respectively, using methods such as UV curing and/or thermal curing as determined by their respective chemical compositions.

Figure 8:
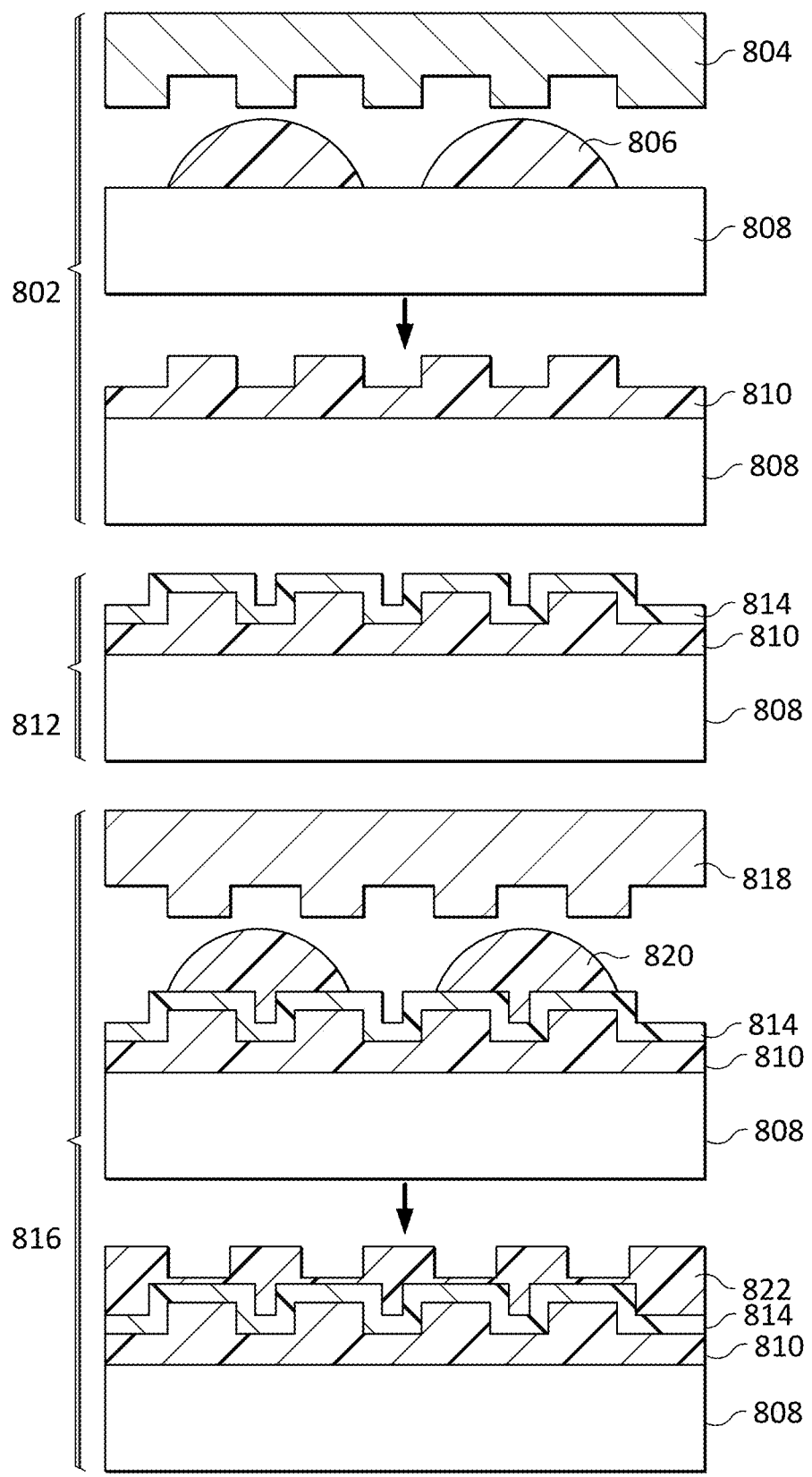

As shown in the example of FIG. 8, during a first phase 802 a substance 806 with a first refractive index is applied to one side of the substrate 808, and a first template 804 is used to mold the substance 806 into the pattern 810 for the OPE layer. During a second phase 812, a second material 814 is deposited on top of the OPE layer. The second material 814 can have a higher index of refraction (e.g., 3 or higher) than the first material 806. The deposition of the second material 814 may be through any suitable technique, including physical vapor deposition (PVD) (e.g., sputter and evaporation), chemical vapor deposition (CVD) (e.g., atmospheric pressure plasma enhanced CVD (APPECVD), atomic layer deposition (ALD), low pressure plasma enhanced CVD (LPPECVD), etc.), and so forth. During a third phase 816, a substance 820 is applied on top of the layer of second material 814, and a second template 818 can be used to mold the substance 820 into the pattern 822 for the EPE layer. The third substance 820 may have a similar or same refractive index as the first material 806, and/or lower than the refractive index of the high index material 814.

Figure 9:
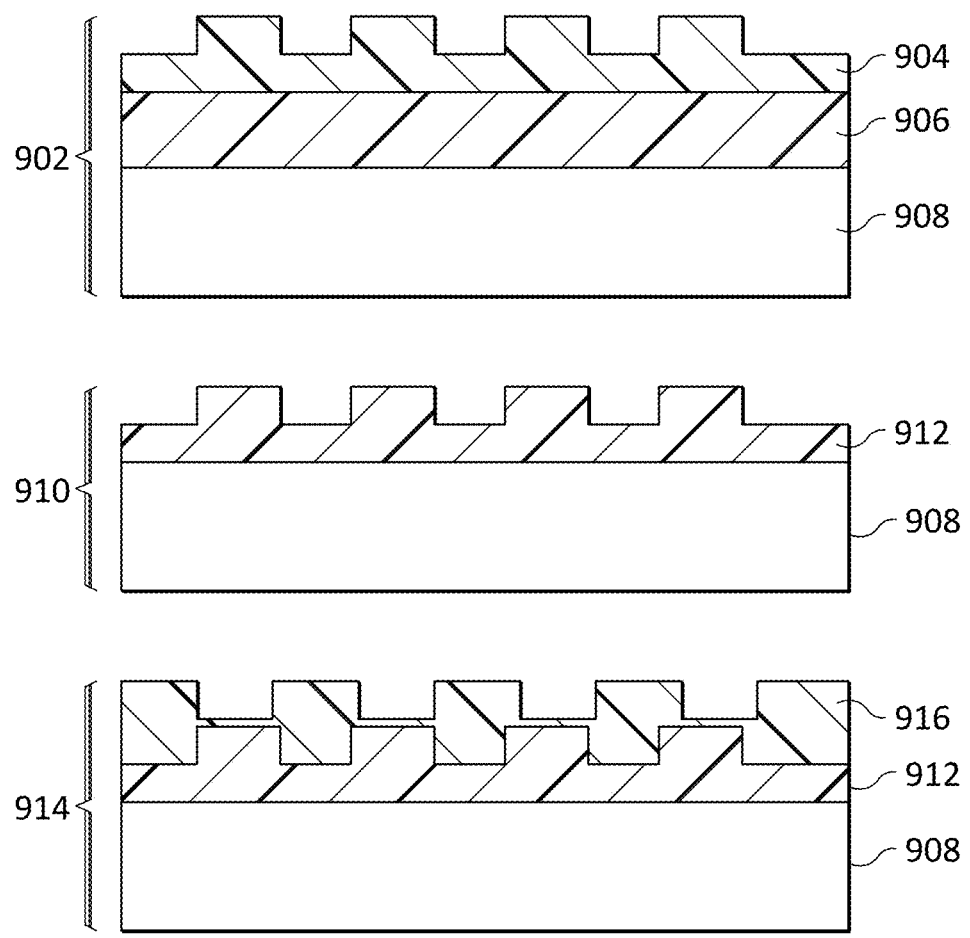

As shown in the example of FIG. 9, during a first phase 902, a lower index material 904 can be patterned over a higher index coating 906 on the substrate 908 as described above with reference to FIGS. 7 and 8. During a second phase 910, the higher index coating 906 can be etched to provide the OPE layer 912. During a third phase 914, the lower index material 904 is patterned over the higher index pattern 912, to provide the EPE layer 916.

Figure 10:
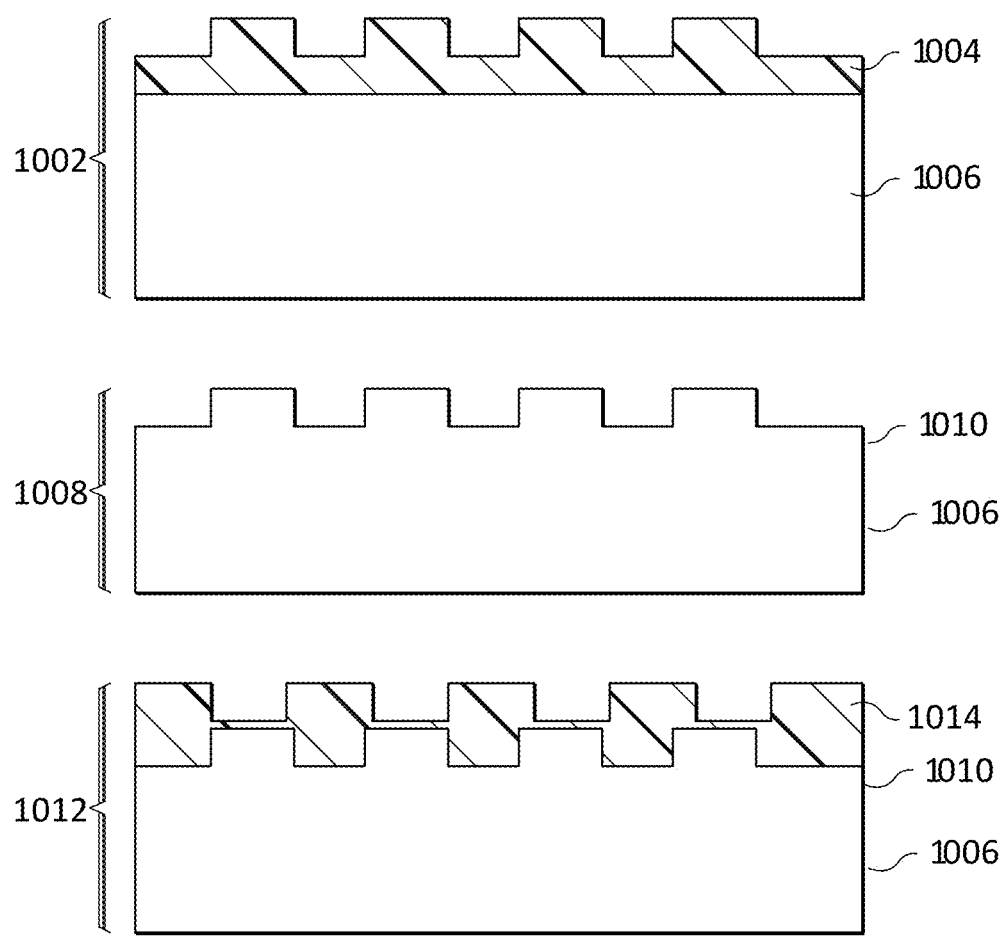

The technique of FIG. 9 can be modified somewhat, such that the lower index substance is patterned directly onto the substrate (which has a higher index), without using the intermediary higher index coating 906. FIG. 10 shows an example of this technique. During a first phase 1002, a lower index material 1004 can be patterned over the higher index substrate 1006. During a second phase 1008, the higher index substrate 1006 can be etched to provide the OPE layer 1010. During a third phase 1012, the lower index material 1004 is patterned over the higher index pattern 1010, to provide the EPE layer 1014.

Implementations support various suitable structures and geometries of the patterns that may be applied to the substrate. For example, the patterns can be a symmetric stepped, tapered structure, or an asymmetric (e.g., blaze) structure such as a saw-tooth, slanted, and/or multi-step pattern of features.

The eyepiece may have any suitable number of layers of glass or other material, and each layer may act as a waveguide to allow the passage of various frequencies of light. For a single layer eyepiece, the grating application techniques described herein may be used to apply gratings to one side of the eyepiece. For a multi-layer eyepiece, the grating application techniques described herein may be used to apply gratings to one side of at least one of the layers. In some examples, layers may be configured as waveguides for particular wavelengths, so as to propagate light of a particular color, and the eyepiece may be configured for a particular optical power, to create a number of depth planes at which light through the waveguide may be perceived. For example, a first set of waveguide layers may include layers for red, green, and blue light at a first depth plane, and a second set of waveguide layers may include a second set of layers for red, green, and blue light corresponding to a second depth plane. The order of the colors may be arranged differently in different depth planes to achieve the desired optical effects in the eyepiece. In some embodiments, a single (e.g., blue) layer may cover multiple depth planes.

In some examples, the eyepiece may be created at least in part using Jet and Flash Imprint Technology (J-FIL™), developed by Molecular Imprints™. The J-FIL technique may be used to create diffraction gratings on the layers of the glass of the eyepiece to create waveguide displays. Each layer may be a thin layer of glass with polymer gratings created on its surface using J-FIL. The diffraction gratings may provide the basic working functionality of the layer, and multiple layers may be stacked to assemble the eyepiece. Once the diffraction gratings are formed onto a large, broad glass layer, the glass layer may be laser cut into the shape of the eyepiece. Each layer of glass may be a different color, and there may be multiple depth planes. A larger number of planes may provide for a better virtual experience for a user using the eyepiece. The layers may be stacked using the sealant polymer (e.g., glue dots or line), and the whole stack may be sealed using a sealant in some examples, to provide structural integrity, preserve a gap between layers, prevent contamination, and/or prevent back-reflection of light within the eyepiece.

While this specification contains many specific details, these should not be construed as limitations on the scope of the disclosure or of what may be claimed, but rather as examples of features that are associated with particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

A number of embodiments have been described. Nevertheless, it will be understood that various modifications may be made without departing from the spirit and scope of the disclosure. For example, various structures shown above may be used, with elements rearranged, positioned differently, oriented differently, added, and/or removed. Accordingly, other embodiments are within the scope of the following claims.

What is claimed is:

1. A method of making a template for applying a grating pattern to a waveguide, the method comprising:
    etching a first pattern in a first side of a template substrate; and
    imprinting a second pattern in the first side of the template substrate to form the template, the second pattern being superimposed onto the first pattern in the template substrate to form the template that includes, on one side of the template, a combined pattern that is a combination of the first pattern and the second pattern, wherein the first pattern corresponds to one of an orthogonal pupil expander (OPE) grating or an exit pupil expander (EPE) grating, and the second pattern corresponds to a different one of the OPE grating or the EPE grating.

2. The method of claim 1, wherein the template substrate is composed at least partly of one or more of $SiO_2$ and Si.

3. The method of claim 1, further comprising:
employing the template to apply the combined pattern to one side of the waveguide, such that the combined pattern on the waveguide exhibits both OPE and EPE diffraction properties.

4. The method of claim 3, wherein employing the template further comprises:
contacting the template with a polymerizable material arranged on the one side of a substrate of the waveguide;
solidifying the polymerizable material to form, on the one side of the substrate, the combined pattern based on the template; and
separating the template from the substrate.

5. The method of claim 1, wherein the refractive index of the OPE grating exceeds the refractive index of the EPE grating.

6. The method of claim 5, wherein the refractive index of the template substrate exceeds the refractive index of the OPE grating and the refractive index of the EPE grating.

7. The method of claim 5, wherein a difference between the refractive index of the OPE grating and the refractive index of the EPE grating is at least 0.2.

8. The method of claim 5, wherein the OPE grating, the EPE grating, or both comprise a line grating.

9. The method of claim 5, wherein the OPE grating, the EPE grating, or both comprise pillars or holes.

10. The method of claim 1, wherein the first pattern corresponds to one of a single orthogonal pupil expander (OPE) grating or an exit pupil expander (EPE) grating, and the second pattern corresponds to a different one of the single OPE grating or the EPE grating.

11. A waveguide structure, comprising:
a substrate; and
a combined pattern applied to one side of the substrate, wherein the combined pattern is a superposition of a single orthogonal pupil expander (OPE) diffraction grating pattern and an exit pupil expander (EPE) diffraction grating pattern, such that the combined pattern on the waveguide structure exhibits both OPE and EPE diffraction properties.

12. The waveguide structure of claim 11, further comprising an in-coupling grating (ICG) pattern.

13. The waveguide structure of claim 11, wherein the substrate is glass.

14. The waveguide structure of claim 11, wherein the refractive index of the OPE diffraction grating pattern exceeds the refractive index of the EPE diffraction grating pattern.

15. The waveguide structure of claim 11, wherein the refractive index of the substrate exceeds the refractive index of the OPE diffraction grating pattern and the refractive index of the EPE diffraction grating pattern.

16. The waveguide structure of claim 11, wherein a difference between the refractive index of the OPE diffraction grating pattern and the refractive index of the EPE diffraction grating pattern is at least 0.2.

17. The waveguide structure of claim 11, wherein the OPE diffraction grating pattern, the EPE diffraction grating pattern, or both comprise a line grating.

18. The waveguide structure of claim 11, wherein the OPE diffraction grating pattern, the EPE diffraction grating pattern, or both comprise pillars or holes.

19. A method of making a template for applying a grating pattern to a waveguide, the method comprising:
etching a first pattern in a first side of a template substrate; and
transferring, using dry etching, a second pattern from resist into the first side of the template substrate to form the template, the second pattern being superimposed onto the first pattern in the template substrate to form the template that includes, on one side of the template, a combined pattern that is a combination of the first pattern and the second pattern,
wherein the first pattern corresponds to one of an orthogonal pupil expander (OPE) grating or an exit pupil expander (EPE) grating, and the second pattern corresponds to a different one of the OPE grating or the EPE grating.

* * * * *